United States Patent [19]
Ha

[11] Patent Number: 5,809,264
[45] Date of Patent: Sep. 15, 1998

[54] INTERFACE WITH DEVICE HAVING UNUSUAL ACCESS TIME AND METHOD THEREOF

[75] Inventor: Hyun Woo Ha, Ichon-shi, Rep. of Korea

[73] Assignee: Hyundai Electronic Industries Co., Ltd., Kyoungki-Do, Rep. of Korea

[21] Appl. No.: 627,404

[22] Filed: Apr. 4, 1996

[30] Foreign Application Priority Data

Apr. 18, 1995 [KR] Rep. of Korea .................. 95-9098

[51] Int. Cl.⁶ .................................................. G06F 13/14
[52] U.S. Cl. ....................... 395/310; 395/733; 395/856
[58] Field of Search .................... 395/310, 733, 395/856

[56] References Cited

U.S. PATENT DOCUMENTS

| | | | |
|---|---|---|---|
| 5,432,947 | 7/1995 | Doi | 395/750 |
| 5,502,822 | 3/1996 | Takebe | 395/310 |
| 5,557,757 | 9/1996 | Gephardt et al. | 395/306 |

*Primary Examiner*—Glenn A. Auve
*Attorney, Agent, or Firm*—Merchant, Gould, Smith, Edell, Welter & Schmidt

[57] ABSTRACT

An interface between a processor without ready or data acknowledge signal and a device having a remarkably slow or variable access time including: first and second latch terminals latching data and addresses; and a decoder controlling the latches and the flow of data. This interface is capable of lifting the restriction to usable devices to facilitate selection of processors or devices.

2 Claims, 2 Drawing Sheets

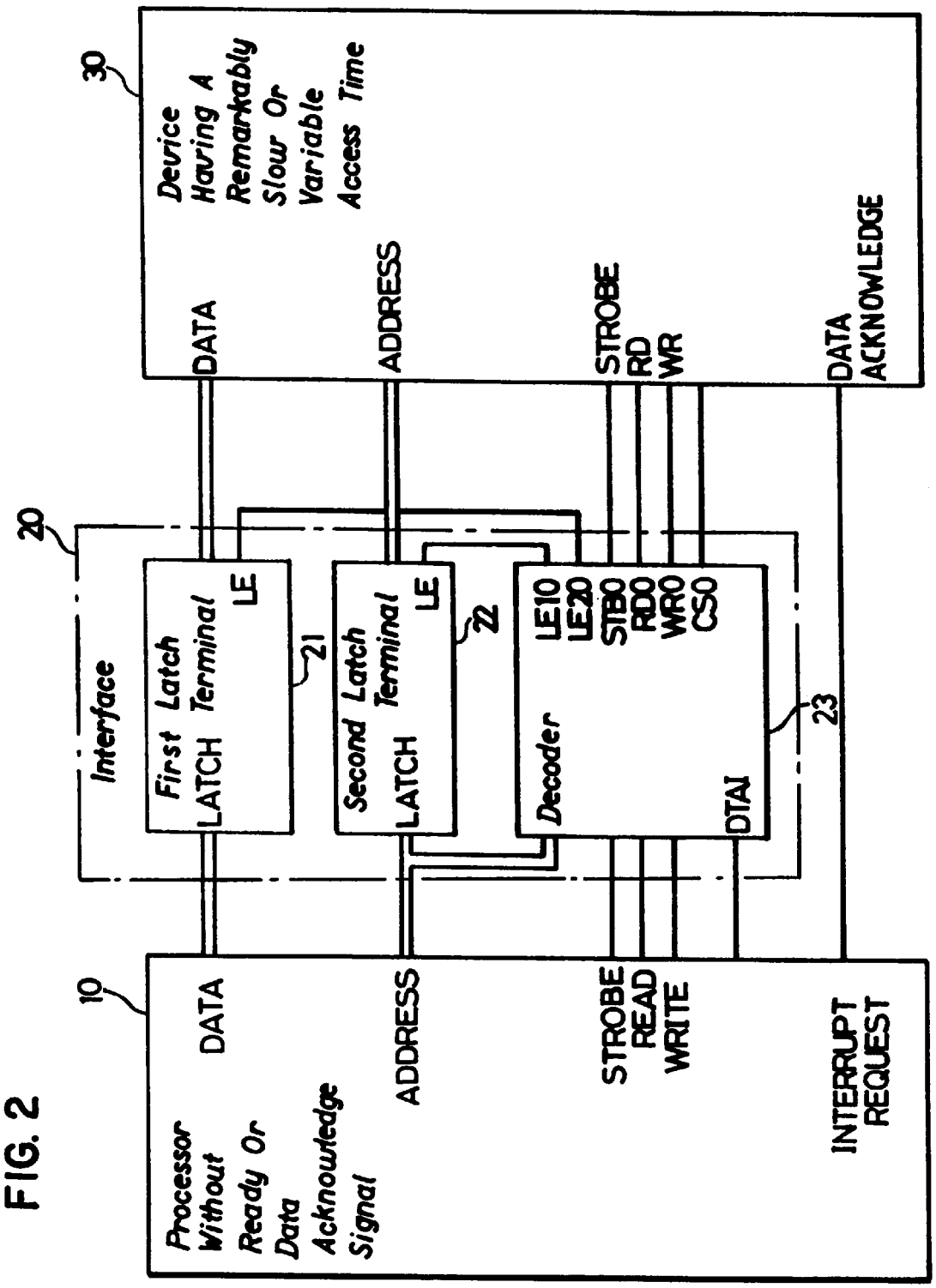

INTERFACE WITH DEVICE HAVING UNUSUAL ACCESS TIME AND METHOD THEREOF

BACKGROUND OF THE INVENTION

The present invention relates to an interface and a method of interfacing that allows a device having a remarkably slow or variable access time to interface with another device such as a micro-controller without ready or data acknowledge (DTACK) signal by an interrupt function that usually exists in processors, using data acknowledge (ACK) pins that are commonly provided by such processors.

Recently manufactured processors of more than 16 bit are temporarily held stationary until another device having an access time with large fluctuational range compared to the processors is ready for interfacing.

8-Bit processors or those that were previously manufactured cannot operate with devices such as MITEL MT 8980 whose access time fluctuates excessively.

FIG. 1 is a timing diagram of MITEL MT 8980 processor having a remarkably slow or variable access time, and TABLE 1 represents critical time values according to the characteristics of MT 8980.

TABLE 1

| Characteristics | Symbol | Min. | Average | Max. | Unit | Test Condition |
|---|---|---|---|---|---|---|
| Chip Select Setup Time | $t_{CSS}$ | 20 | 0 | | ns | |
| Read/Write Setup Time | $T_{RWS}$ | 25 | 5 | | ns | |
| Address Setup Time | $t_{ADS}$ | 25 | 5 | | ns | |
| Acknowledgement | | | | | | |
| Fast | $t_{AKD}$ | | 40 | 100 | ns | CL = 150 pF |
| Slow Delay | $t_{AKD}$ | 2.7 | | 7.2 | cycles | /C4i cycles |
| Fast Write Data Setup | $t_{FWS}$ | 20 | | | ns | |
| Slow Write Data Setup | $t_{SWD}$ | | 2.0 | 1.7 | cycles | /C4i cycles |
| Read Data Setup Time | $t_{RDS}$ | | | 0.5 | cycles | /C4i cycles, CL = 150 pF |
| Data Hold Time | | | | | | RL = 1K OHM, |
| Read | $t_{DHT}$ | 20 | | | ns | CL = 150 pF |
| Write | $t_{DHT}$ | 20 | 10 | | ns | |
| Read Data to High Impedance | $t_{RDZ}$ | | 50 | 90 | ns | RL = 1K OHM, CL = 150 pF |
| Chip Select Hold Time | $t_{CSH}$ | 0 | | | ns | |
| Read/Write Hold Time | $t_{RWH}$ | 0 | | | ns | |
| Address Hold Time | $t_{ADH}$ | 0 | | | ns | |
| Acknowledgement Hold Time | $t_{AKH}$ | 10 | 60 | 80 | ns | RL = 1K OHM, CL = 150 pF |

Referring to TABLE 1, data strobe is given as the acknowledge time, and the time period for outputting data, $t_{AKD}$ is in the range of 40 nS to 7.2 cycles of /C4i (clock input of 4.096 MHz, 1 cycle=250 nS), i.e. 1.76 uS. Considering the buffer delay as well as the chip select setup time, the time required for chip selection and output of data from the processor to access data is variable, ranging from a minimum 40 nS to a maximum 2 uS.

It turns out that such a processor cannot interface with another processor having a fixed access time. This is because the access time of the processor without DTACK or ready, i.e., the time period for producing read data and address and receiving data, is subject to the machine cycle, and the range of the access time is restricted.

For example, if a 8051 type processor, that has been commonly used in recent days, is operated at 8 MHz,/RD is set as zero, and correct data can be read out just within 460 nS to 650 nS.

SUMMARY OF THE INVENTION

In an effort to solve the above-mentioned problem, the present invention comprises an interface and a method for interfacing that allow a device having a remarkably slow or variable access time to interface with another device such as a micro-controller without ready or data acknowledge (ACK) signal by an interrupt function that usually exists in processors and data acknowledge (ACK) pins that are commonly provided to such a processor.

In the memory map list of a device having a remarkably slow or variable access time, the range of access time is divided into a request range and an active range, the request range being accessed at the time of the first read or the first write. When a data acknowledge signal, informing that data is available, is produced from the device, the active range is accessed by the interrupt service routine's reading out or writing into the active range to process data.

In order to achieve the above object, the interface of the invention, positioned between a processor without ready or data acknowledge signal and a device having a remarkably slow or variable access time, comprises:

first and second latch terminals latching data and addresses; and a decoder controlling the latches and the flow of data.

As another aspect of the present invention, a method for interfacing between devices having unusual access times comprises the steps of:

accessing the request range at the time of a first read or a first write by dividing the range of access time into a request range and an active range in a memory map of the device having a remarkably slow or variable access time;

producing an interrupt when a data acknowledge signal, informing that data is available, is produced from the device; and accessing the active range by the interrupt service routine's reading out or writing into the active range to process data.

BRIEF DESCRIPTION OF THE DRAWINGS

The above objects and other advantages of the present invention will become more apparent upon consideration of presently preferred embodiments of the present invention with reference to the attached drawings in which:

FIG. 2 is a schematic circuit diagram of the present invention.

DETAILED DESCRIPTION OF THE PREFERRED EMBODIMENTS

Figure 1:
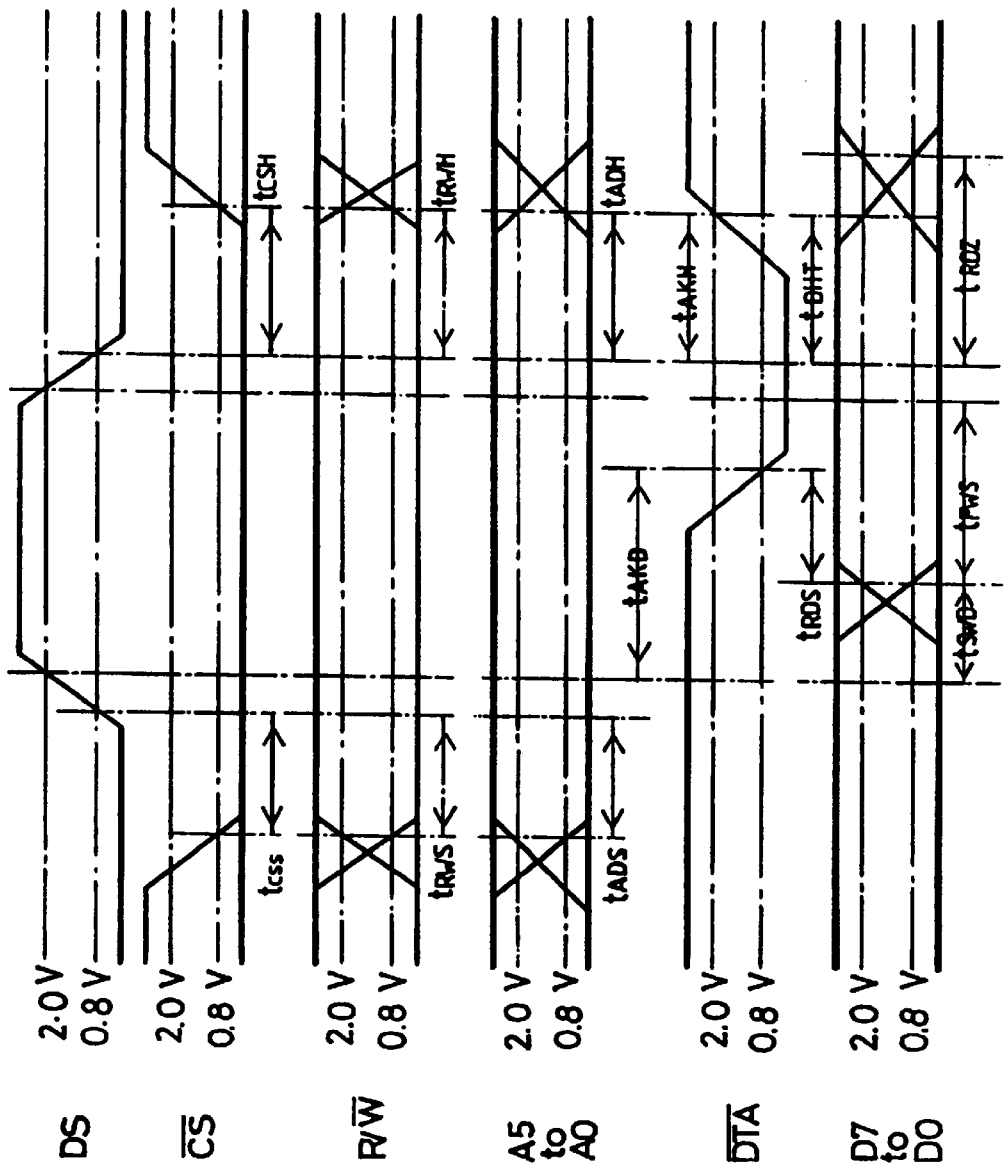
FIG. 1 is a timing diagram of a device having an unusual access time.

Preferred embodiments of the present invention will now be discussed in detail with reference to the accompanying drawings.

As shown in FIG. 2, an interface 20 of the present invention includes first and second latch terminals 21 and 22 that latch data and addresses, and a decoder 23 that controls the latches 21 and 22 as well as the flow of data between a processor 10 without ready or data acknowledge (DTACK) signal and a device 30 having a remarkably slow or variable access time.

The following description relates to the function of the above-mentioned latches and decoder.

When a request range is detected and STROBE is set, a chip select terminal is set and then reset as an active range is detected and STROBE is set. When the request range is detected, and STROBE as well as READ are set, a read terminal is set and then reset as the active range is detected and STROBE as well as READ are set. When the request range is detected, and STROBE as well as WRITE are set, a Write terminal is set and then reset as the active range is detected and STROBE as well as WRITE are set. A strobe terminal is set when the request range is detected and STROBE is set, and the strobe terminal is reset when the active range is detected and STROBE is set. The first latch terminal latches a first latch by producing a first pulse when the requested range is detected. The second latch terminal latches a second latch by producing a first pulse when the request range is detected and READ as well as DATA ACKNOWLEDGE are set. In addition, when the request range is detected, and WRITE as well as STROBE are set, the second latch terminal latches the second latch.

In the memory map list of a device having a remarkably slow or variable access time, the range of access time is divided into a request range and an active range, the request range being accessed at the time of a first read or a first write. When a DATA ACKNOWLEDGE SIGNAL, informing that data is available, is produced from the device, the active range is accessed by an interrupt service routine's reading out or writing into the active range to process data.

Prior art technique allows a device having a remarkably slow or variable access time to interface with a processor having a considerably slow access time or to interface with an expensive processor having a ready or data acknowledge signal which, however, causes a lot of difficulties from economical and technical aspects. By employing the present invention, such a restriction may be lifted to facilitate a wider selection of processors or devices.

The preferred embodiment of the present invention is given by way of example, and the invention recited in the attached claims is not limited to the illustrative embodiment. Those of ordinary skill in the art will recognize that routine design changes may be made to the exemplary embodiments without departing from the scope of the claims.

What is claimed is:

1. A method for interfacing between devices of which at least one has a variable access time or an access time so slow that a processor is temporarily held stationary until the device is ready for interfacing, comprising the steps of:

accessing a request range at a time of a first read or a first write by dividing a range of access time into a request range and an active range in a memory map of one device having a variable access time or an access time so slow that a processor is temporarily held stationary until the device is ready for interfacing;

producing an interrupt when a data acknowledge signal informing that data is available is produced from a device; and accessing the active range by an interrupt service routine's reading out or writing into the active range to process data.

2. The method as set forth in claim 1, further comprising the steps of:

setting a chip select terminal when a request range is detected and STROBE is set, and resetting the chip select terminal when an active range is detected and STROBE is set; setting a read terminal when the request range is detected and STROBE as well as READ are set, and resetting the read terminal when the active range is detected and STROBE as well as READ are set; setting a write terminal when the request range is detected and STROBE as well as WRITE are set, and resetting the write terminal when the active range is detected and STROBE as well as WRITE are set; setting a strobe terminal when the request range is detected and STROBE is set, and resetting the strobe terminal when the active range is detected and STROBE is set; a first latch terminal latching a first latch by producing a first pulse when the request range is detected; a second latch terminal latching a second latch by producing the first pulse when the request range is detected and READ as well as DATA ACKNOWLEDGE are set; and the second latch terminal latching the second latch when the request range is detected and WRITE as well as STROBE are set.

* * * * *